US008330761B2

(12) United States Patent
Lin et al.

(10) Patent No.: US 8,330,761 B2
(45) Date of Patent: Dec. 11, 2012

(54) APPARATUS AND METHOD FOR REDUCING OUTPUT RATE OF VIDEO DATA

(75) Inventors: Tzuo-Bo Lin, Tai Pei (TW); Wen-Hsia Kung, Lung Tan Hsaing (TW)

(73) Assignee: Realtek Semiconductor Corp., Hsinchu (TW)

( * ) Notice: Subject to any disclaimer, the term of this patent is extended or adjusted under 35 U.S.C. 154(b) by 1358 days.

(21) Appl. No.: 12/010,374

(22) Filed: Jan. 24, 2008

(65) Prior Publication Data

US 2008/0211821 A1 Sep. 4, 2008

(30) Foreign Application Priority Data

Jan. 26, 2007 (TW) .............................. 96102935 A

(51) Int. Cl.
*G06F 15/00* (2006.01)

(52) U.S. Cl. ....................................................... 345/501

(58) Field of Classification Search .................. 345/501
See application file for complete search history.

(56) References Cited

U.S. PATENT DOCUMENTS

| | | | | |
|---|---|---|---|---|
| 5,765,197 | A * | 6/1998 | Combs | 711/164 |
| 7,487,273 | B2 * | 2/2009 | Kobayashi | 710/62 |
| 7,599,439 | B2 * | 10/2009 | Lavelle et al. | 375/240.26 |
| 7,911,536 | B2 * | 3/2011 | Dunton | 348/556 |
| 7,995,143 | B2 * | 8/2011 | Christison et al. | 348/500 |
| 8,051,217 | B2 * | 11/2011 | Goodart et al. | 710/17 |
| 2006/0050075 | A1 * | 3/2006 | Gong et al. | 345/546 |
| 2006/0071922 | A1 | 4/2006 | Chou | |
| 2007/0002169 | A1 * | 1/2007 | Munsil et al. | 348/446 |

OTHER PUBLICATIONS

DisplayPort Technical Overview, Oct. 27, 2005.

* cited by examiner

*Primary Examiner* — Daniel Washburn
(74) *Attorney, Agent, or Firm* — Muncy, Geissler, Olds & Lowe, PLLC

(57) ABSTRACT

A method for reducing output rate of video data for DisplayPort sink device is disclosed. By reducing the size of a blank area in a video frame, the invention reduces a pixel rate to become compatible with more types of back-end circuits having lower processing rates.

24 Claims, 7 Drawing Sheets

APPARATUS AND METHOD FOR REDUCING OUTPUT RATE OF VIDEO DATA

BACKGROUND OF THE INVENTION

1. Field of the Invention

The invention relates to video interface and more particularly, to an apparatus and method for reducing output rate of video data for DisplayPort receiver.

2. Description of the Related Art

FIG. 1 shows a schematic diagram illustrating a DisplayPort interface 130 coupling a source device 110 with a sink device 120, and the data flow through the interface.

DisplayPort is a new digital display interface standard put forth by the Video Electronics Standard Association (VESA). As shown in FIG. 1, the DisplayPort interface 130 consists of a Main Link, an auxiliary channel (AUX CH), and a hot plug detect (HPD) signal line. The auxiliary channel with low-latency (each transaction taking no longer than 500 μs), providing for 1 Mbps of data rate of auxiliary nature, is a half-duplex bidirectional channel used for main link management and device control (upon the source device 110 and the sink device 120). The HPD signal line can serve to issue an interrupt request by the sink device (or receiver) 120 to the source device (or transmitter) 110.

Main Link is a high-bandwidth, low-delay, uni-directional interface for isochronous streaming. The number of lanes of Main Link can be either 1, 2, or 4 lanes, for providing for simultaneous digital video and audio streaming transmission. Each lane supports transmission at two link rates ($F_{link}$): 1.62 Gbps or 2.7 Gbps per lane. Therefore, DisplayPort offers up to 10.8 Gbps of bandwidth. It should be noted that in the following description the above-mentioned link rate $F_{link}$ should be distinguished from another two transmission rates, a link symbol rate $F_{sym}$ and a pixel rate $F_{pix}$. The link symbol rate $F_{sym}$ indicates the data-transfer rate in terms of symbol over the Main Link. For each lane, eight bits are generally transmitted for each symbol, which means that only a portion of the data of a pixel is transmitted by each symbol, such as the red (R) data in red/green/blue (RGB) pixel data. In practice, the link symbol rate $F_{link}$ is defined as 1/10 of the link rate $F_{link}$ through downsampling; therefore two link symbol rate $F_{sym}$ can be observed: 162 Mbps and 270 Mbps. The pixel rate $F_{pix}$, decoupled from the link symbol rate $F_{sym}$ and the link rate $F_{link}$, refers to the pixel (each pixel generally containing 24 bits, i.e., all RGB data) transfer rate of the source device 110.

DisplayPort requires no dedicated channel for forwarding clock. The sink device 120 utilizes data recovery strategy to recover the link symbol rate $F_{sym}$ from the received data streams. While utilizing the DisplayPort to transmit data, the source device 110 generates the pixel data at a pixel rate $F_{pix}$, which is decoupled from the link rate $F_{link}$. The source device 110 delivers time stamp values $M_{vid}$ [23:0], $N_{vid}$ [23:0] to the sink device 120 by means of frequency ratio packets (the frequency ratio packets also contain the audio time stamp values $M_{aud}$ and $N_{aud}$, which are not to be discussed herein) or stream attribute packets specified by DisplayPort standard, according to which the sink device 120 is able to recover a pixel clock $CLK_{pix}$ having the pixel rate $F_{pix}$. In other words, the sink device 120 can recover the pixel clock $CLK_{pix}$ or the pixel rate $F_{pix}$ of the transmit device 110 according to the link symbol clock $CLK_{sym}$ (having the link symbol rate $F_{sym}$) the time stamp values $M_{vid}$, $N_{vid}$, and a circuit configuration, as shown in FIG. 2, including two frequency dividers 210, 230 and a phase-locked loop (PLL) 220; that is, the pixel clock $CLK_{pix}$ and the symbol clock $CLK_{sym}$ are decoupled from each other in the source device 110, and the conversion or mapping between these two clocks is conveyed in the time stamp values $M_{vid}$, $N_{vid}$ and expressed as the following mathematical equation: $T_{pix} \times M_{vid} = T_{sym} \times N_{vid}$. Accordingly, the pixel rate can be derived as follows: $F_{pix} = (M_{vid}/N_{vid}) \times F_{sym}$.

FIG. 3A shows a diagram illustrating relevant image attribute parameters of a frame. FIG. 3B shows a timing diagram illustrating the relationship of a vertical synchronization signal VS, a horizontal synchronization signal HS, and a data enable signal DE. The main stream attribute packet transmitted by the source device 110 further contains the following image attribute parameters (referring to FIG. 3A): a frame width $H_{total}$, a frame height $V_{total}$, a left blanking width $H_{start}$, a top blanking height $V_{start}$, an active area width $H_{width}$, an active area height $V_{height}$, a vertical synchronization width $W_{VS}$, a horizontal synchronization width $W_{HS}$, and so forth, which are provided for the sink device 120 to recover the original frame format, i.e., both the size and relative location of the active area 310 and the blanking (or non-active) area 320 in a frame.

Compliant with the DisplayPort specification, the sink device 120 utilizes the above-mentioned recovered pixel rate $F_{pix}$ as the sampling frequency for transmitting the video data to the back-end circuit, and subsequently constructs or recovers image control signals according to the above-mentioned image attribute parameters. Referring to FIG. 3B, firstly, a vertical synchronization signal VS is constructed according to a pixel period $T_{pix}$ and the vertical synchronizing width $W_{VS}$ (in terms of pixel periods), and then the horizontal synchronizing signal HS is constructed according to the pixel period $T_{pix}$, the frame width $H_{total}$, and the horizontal synchronization width $W_{HS}$ (in terms of the pixel periods). Finally, the data enable signal DE and a field signal FIELD (not shown) are constructed according to the pixel period $T_{pix}$, the left blanking width $H_{start}$, and the active area width $H_{width}$, so that the video data can be further processed according thereto.

According to the DisplayPort specification, the sink device 120 is designed only to recover the original pixel clock $CLK_{pix}$. However, there will be a need for the sink device 120 to reduce the pixel rate $F_{pix}$ when the back-end circuit includes either components requiring a large amount of computation such as a scaler, or a display monitor having a lower display frequency, or is limited to the physical constraint of printed circuit boards.

To meet this need, on condition that both the data volume and contents of the active area are not affected, the output rate of video data (or pixel rate) needs to be reduced to become compatible with more types of back-end circuits.

SUMMARY OF THE INVENTION

In view of the above-mentioned problems, an object of the invention is to provide a method for reducing output rate of video data, which achieves the goal of reducing a pixel rate by fully or partially utilizing a blanking area in a frame format.

To achieve the above-mentioned object, the method for reducing output rate of video data for a sink device having a digital display interface comprises the steps of: storing input video data in a buffer according to a link symbol clock; calculating a period of a first frame according to a width of the first frame and a height of the first frame, a ratio of time stamp values and a link symbol clock having the link symbol rate; determining a second pixel rate of the sink device according to a format of the first frame and the period of the first frame; and, generating at least a control signal to access the input video data that stores in the buffer according to a second pixel clock having the second pixel rate.

Another object of the invention is to provide a video receiver, comprising: a clock data recovery circuit for receiving a video data and generating a video data and a clock signal; a decoder coupled to the clock data recovery circuit for decoding the video data and generating a decoded video data and a set of original image attribute parameters; a video buffer coupled to the decoder for temporarily storing the decoded video data; a processing circuit coupled to the decoder for generating a set of adjusted image attribute parameters and a set of setting values according to the set of the original image attribute parameters; a clock generator coupled to the processing circuit for generating an adjusted pixel clock; and, a control signal generator for generating a set of adjusted video control signals according to the set of the adjusted image attribute parameters and the adjusted pixel clock.

According to the invention, on condition that both the data volume and the contents of an active area are not affected, a frame period $T_{frame}$ is fixed first. Then, according to the processing rate limit of the back-end circuit, the size of the blanking area in an original frame format and the storage capacity of the video buffer, a pixel rate most suitable for the processing rate of the sink device is determined and thus corresponding control signals Req, HS', VS', DE', FIELD' are generated.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The apparatus and method for reducing output rate of video data of the invention will be described with reference to the accompanying drawings.

As mentioned above, DisplayPort requires no dedicated channel for forwarding clock, so the sink device 120 is supposed to recover the original pixel clock $CLK_{pix}$. On the other hand, this affords to the sink device 120 a great opportunity to establish a pixel rate that fits the processing rate of its own or the back-end circuit.

Figure 1:
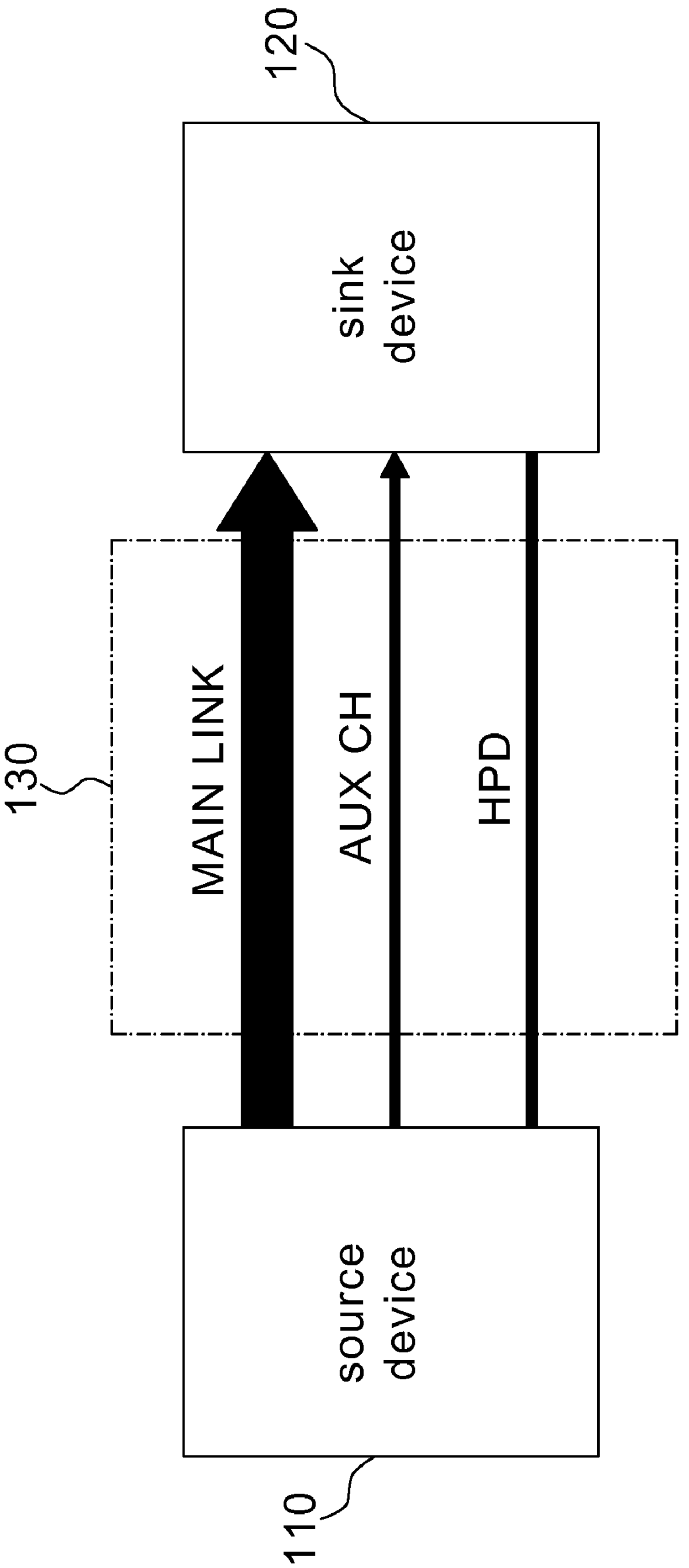
FIG. 1 (PRIOR ART)
FIG. 1 shows a schematic diagram illustrating a DisplayPort interface coupling a source device with a sink device, and the data flow through the interface.
Figure 2:
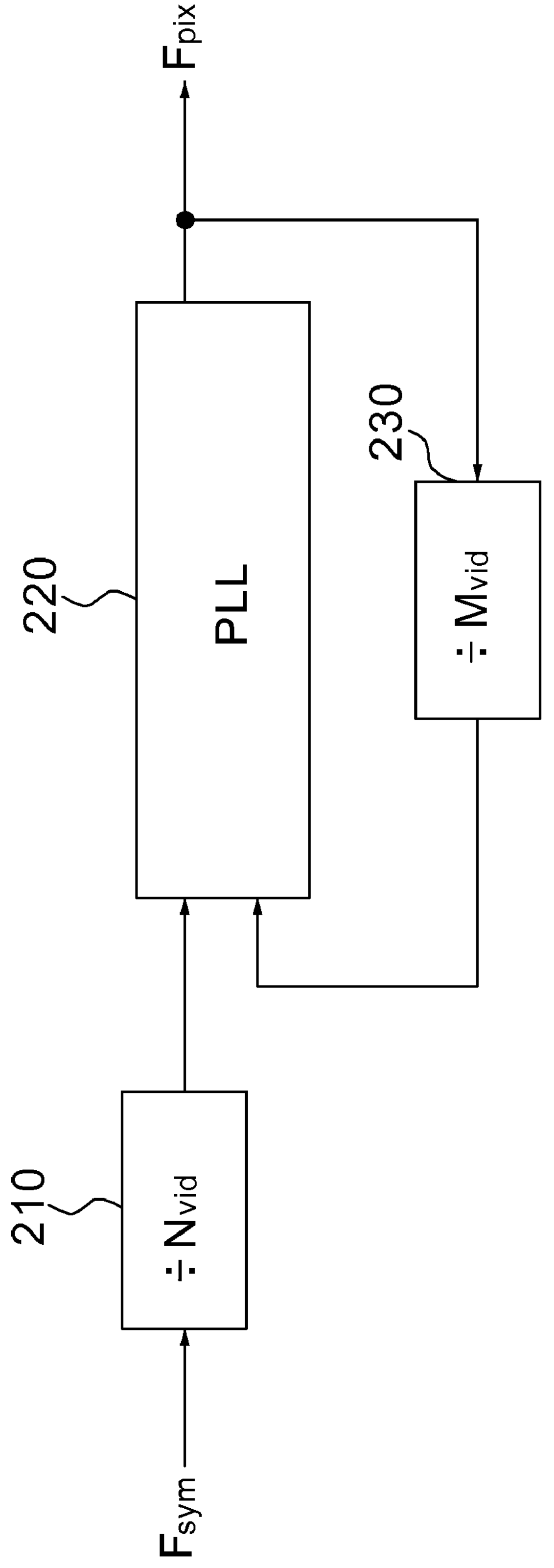
FIG. 2 (PRIOR ART)
FIG. 2 shows a phase-locked loop coupled with two frequency dividers for recovering a pixel rate from a link symbol rate in a DisplayPort sink device.
Figure 3A:
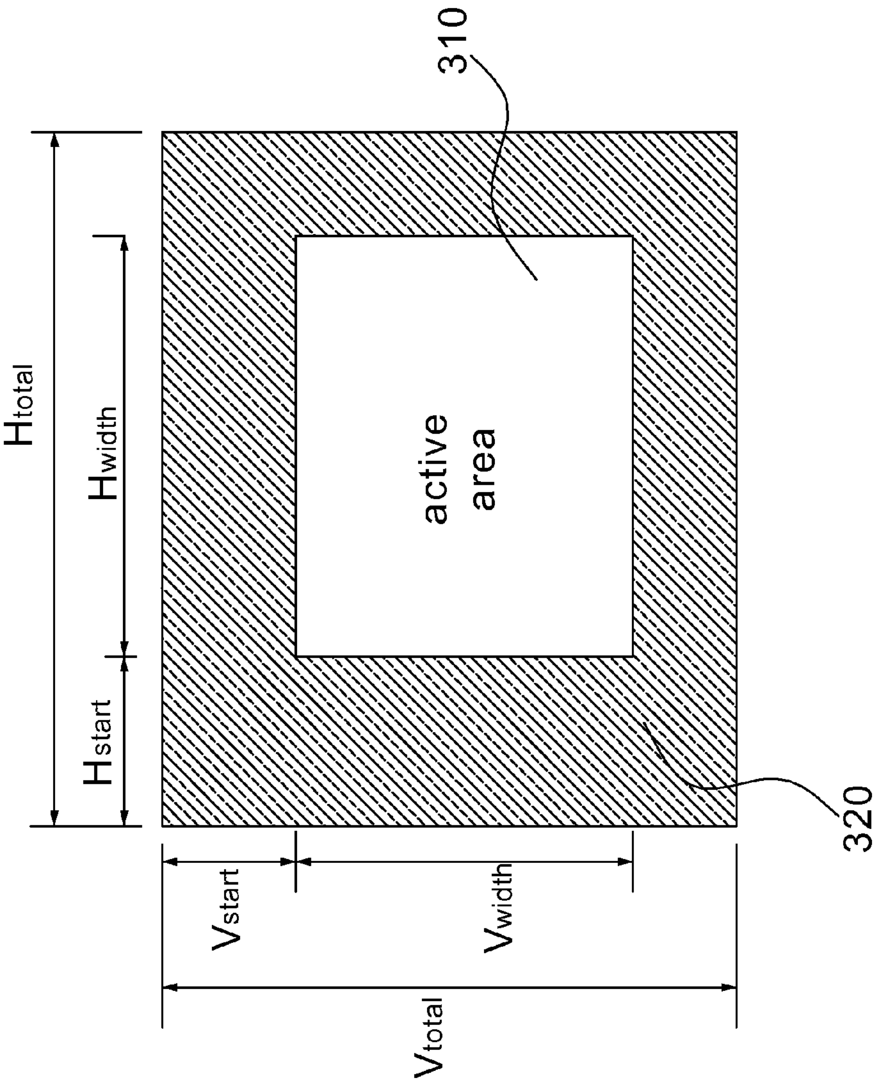
FIG. 3A (PRIOR ART)
FIG. 3A shows a diagram illustrating relevant image attribute parameters of a frame.
Figure 3B:
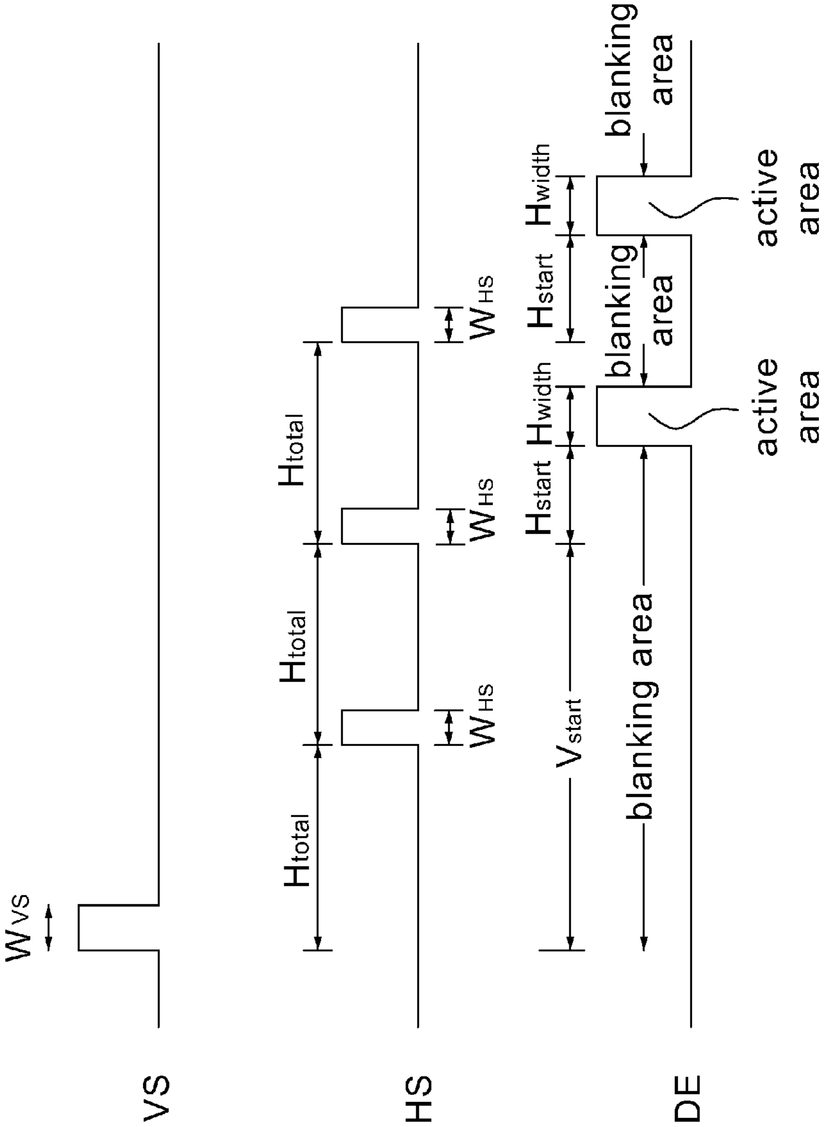
FIG. 3B (PRIOR ART)
FIG. 3B shows a timing diagram illustrating the relationship of a vertical synchronization signal VS, a horizontal synchronization signal HS, and a data enable signal DE.

As can be observed from the data enable signal DE of FIG. 3B, during high-speed frame transmission, as opposed to the active area width $H_{width}$ the transmission of the blanking area still takes up a significant amount of time, which results in too high a pixel rate $F_{pix}$ for the back-end circuit to keep up with and function normally. Therefore, on condition that both the data volume and the contents of the active area are not affected, the invention offers the flexibility in reducing the pixel rate $F_{pix}$ by means of reducing the blank area in the original frame format.

Figure 4:
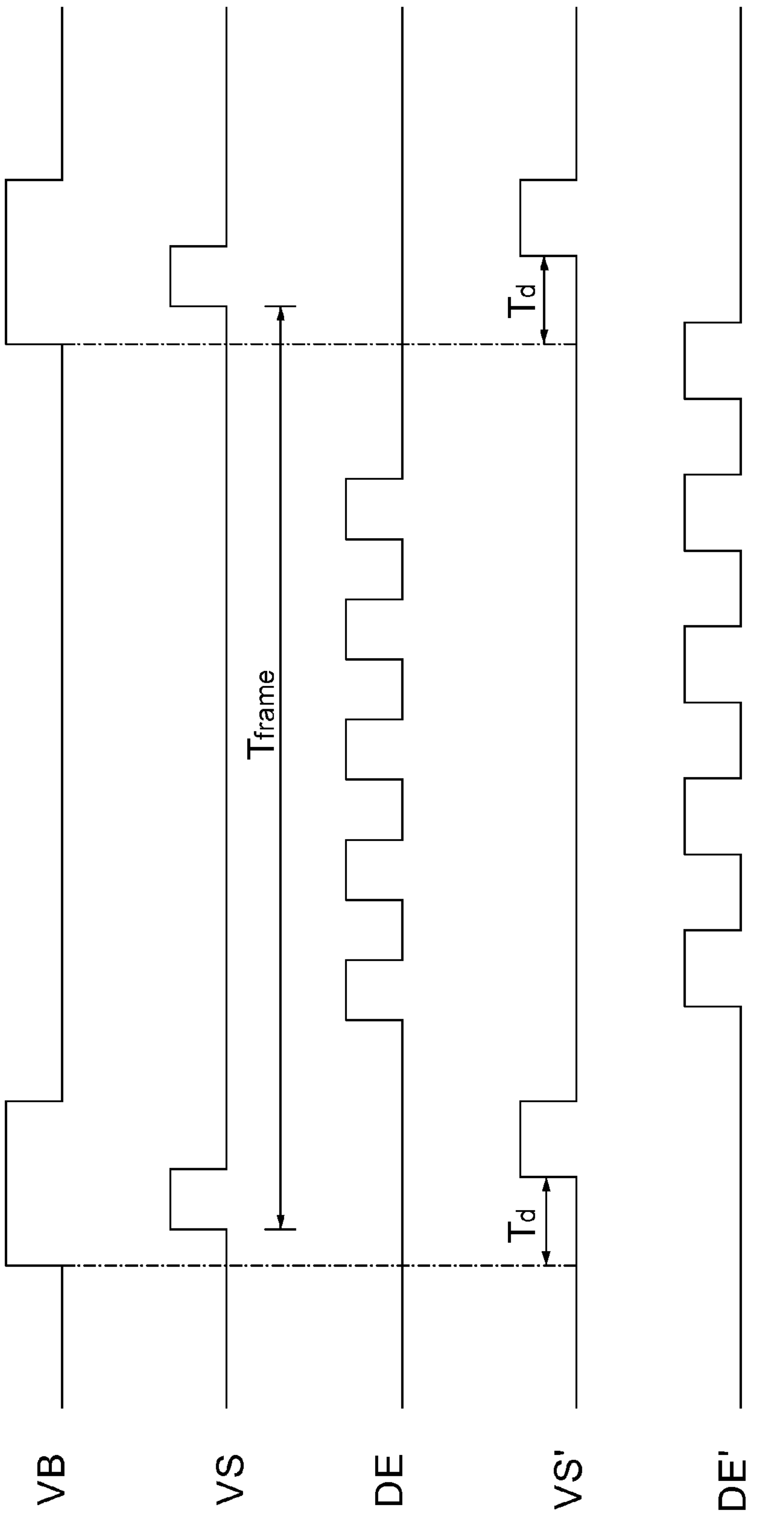
FIG. 4 is a timing diagram showing the relationship among a vertical blanking signal VB, vertical synchronization signals VS, VS', and data enable signals DE, DE' according to the invention.

FIG. 4 is a timing diagram showing the relationship among a vertical blanking signal VB, vertical synchronization signals VS, VS', and data enable signals DE, DE' according to the invention. Here, the vertical synchronization signals VS and the data enable signals DE are the original signals generated by the source device 110, whereas the vertical synchronization signals VS' and data enable signals DE' are recovered signals by the sink device 120 after reducing the pixel rate (or prolonging the pixel period).

In order not to affect the data volume and the contents of the active area, the sink device 120 has to maintain the same vertical refresh rate as the source device 110 does, thus maintaining a stable water-level in the FIFO (such as the video FIFO 530 of FIG. 5) where video data are stored. In other words, as long as the vertical synchronization signals VS' that the sink device 120 reconstructs continues to align with the vertical blanking signal VB (as shown in FIG. 4), the sink device 120 will be able to maintain the same vertical refresh rate as the source device 110 does. In fact, the vertical synchronization signals VS' has to maintain a specific relationship with the vertical blanking signal VB; for example, all rising edges of the vertical synchronization signals VS' have to lag behind all rising edges of the vertical blanking signal VB by a predefined period $T_d$, to avoid skipping or no data available.

Next, the sink device 120 measures the length of a frame period $T_{frame}$ using a fixed reference clock, such as a crystal clock. In general, the number of pixels that a frame includes is equal to the product of the frame width $H_{total}$ and the frame height $V_{total}$; therefore, each original pixel period $T_{pix}$ in the source device 110 is equal to the frame period $T_{frame}$ divided by the product of the frame width $H_{total}$ and the frame height $V_{total}$. Here, the frame width $H_{total}$ is equal to the active area width $H_{width}$ plus the blanking (or non-active) area width $H_{porch}$, while the frame height $V_{total}$ is equal to the active area height $V_{width}$ plus the blanking (or non-active) area height $V_{porch}$.

Accordingly, on condition that both the data volume and the contents of the active area are not affected and the frame period $T_{frame}$ is fixed, the sink device 120 can achieve the goal of reducing the output rate of video data (or the pixel rate) by reducing either the blanking area width $H_{porch}$ or the blanking area height $V_{porch}$. Referring to FIG. 4, given that the frame period $T_{frame}$ is fixed, an enable (logic-high) period of a data enable signal DE' in the sink device 120, as opposed to the original data enable signal DE, can be prolonged if a disable (logic-low) period of the data enable signal DE' (i.e., the non-active area) is reduced; on condition that the data volume of the active area is fixed, a pixel period $T'_{pix}$ then has the flexibility to be prolonged and the pixel rate $F'_{pix}$ be reduced. In terms of mathematical representation, the frame period can be expressed as: $T_{frame}=T_{pix}\times H_{total}\times V_{total}=T'_{pix}\times H'_{total}\times V'_{total}$. Here, if the sink device 120 simultaneously reduces a blanking area width $H'_{porch}$ ($<H_{porch}$) and a blanking area height $V'_{porch}$ ($<V_{porch}$), then the frame width $H'_{total}$ ($=H_{width}+H'_{porch}$)$<H_{total}$ and the frame height $V'_{total}$ ($=V_{height}+V'_{porch}$)$<V_{total}$, thus $T'_{pix}>T_{pix}$ or $F'_{pix}<F_{pix}$. According to the above equations, the degree of decrease in pixel rate $F'_{pix}$ apparently corresponds both to the degree of decrease in the blanking area width $H'_{porch}$ and the degree of decrease in the blanking area height $V'_{porch}$. In other words, the degree of decrease in pixel rate $F'_{pix}$ corresponds to the size of the blanking area in the original frame format. Consequently, the degree of decrease in pixel rate $F'_{pix}$ will be limited if the original blanking area, or non-active area or porch period, in the data enable signal DE is narrow.

Figure 5:
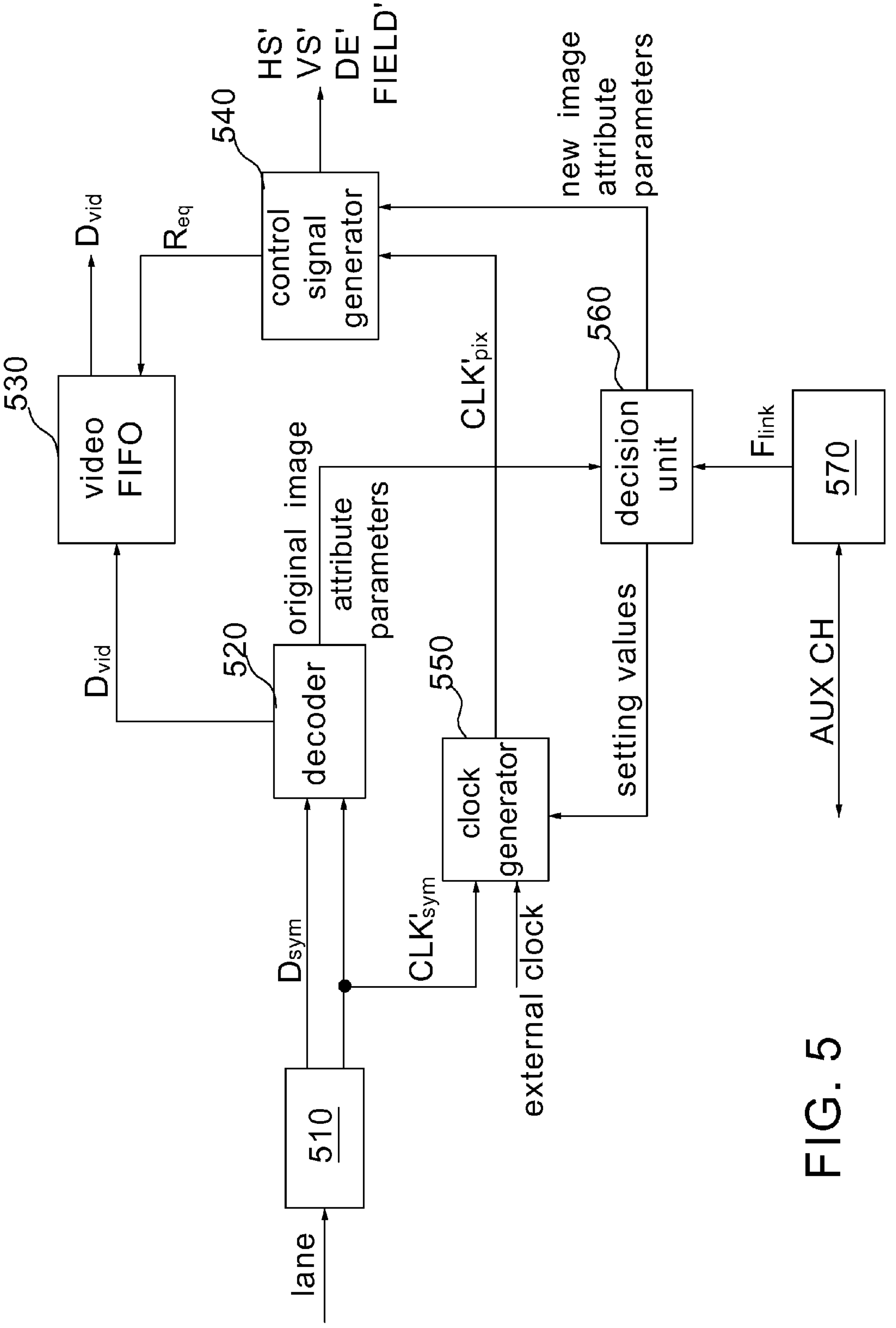
FIG. 5 shows a data flow in a portion of a DisplayPort sink device according to the invention.

FIG. 5 shows a data flow in a portion of a DisplayPort sink device according to the invention. Referring to FIG. 5, a clock data recovery circuit 510, coupled to one of the four lanes of the main link, recovers a link symbol clock $CLK'_{sym}$ (possibly slightly different from the link symbol clock $CLK_{sym}$ that the source device 110 actually generates) based on the received video data and correctly receives video data $D_{sym}$.

According to this embodiment, the decoded video data $D_{vid}$ is stored in the video FIFO 530 according to the link symbol clock $CLK'_{sym}$. Subsequently, to ensure that the back-end circuit functions normally, the data $D_{vid}$ is transmitted according to a slower pixel clock $CLK'_{pix}$ having a pixel rate $F'_{pix}$ while outputted from the video FIFO 530. In fact, the video FIFO 530 is used to serve as buffer for accumulation of data amount caused by a difference in transmission rate between the two pixel clocks. Obviously, the larger the size of the video FIFO 530 is, the more the difference between the rates of the two pixel clocks are allowed, indicating an increased flexibility in reducing the pixel rate.

The decision unit 560 acknowledges the size of the blanking area in the original frame format according to original image attribute parameters, and also determines new image attribute parameters $H'_{total}$, $V'_{total}$, $H'_{start}$, $V'_{start}$ and a new pixel period $T'_{pix}$ (or a new pixel rate $F'_{pix}$) according to the current pixel rate, the time stamp values $M_{vid}$, $N_{vid}$, the processing rate limit of the back-end circuit, and the storage capacity of the video FIFO 530. In order for a clock generator 550 (which can be implemented as a phased lock loop, or PLL) to generate the pixel clock $CLK'_{pix}$, having the pixel rate $F'_{pix}$, the decision unit 560 first generates corresponding setting values to set the clock generator 550. Next, the clock generator 550 generates the pixel clock $CLK'_{pix}$ having the pixel rate $F'_{pix}$ based upon the link symbol rate $CLK'_{sym}$ (or an independent clock source) and said setting values. Finally, according to the pixel clock $CLK'_{pix}$ that the clock generator 550 generates, a control signal generator 540 receives the parameters $W_{VS}$, $W_{HS}$, $H_{width}$, $V_{height}$ and new image attribute parameters $H'_{total}$, $V'_{total}$, $H'_{start}$, $V'_{start}$ that the decision unit 560 provides, to generate new control signals Req, HS, VS, DE, FIELD.

Figure 6:
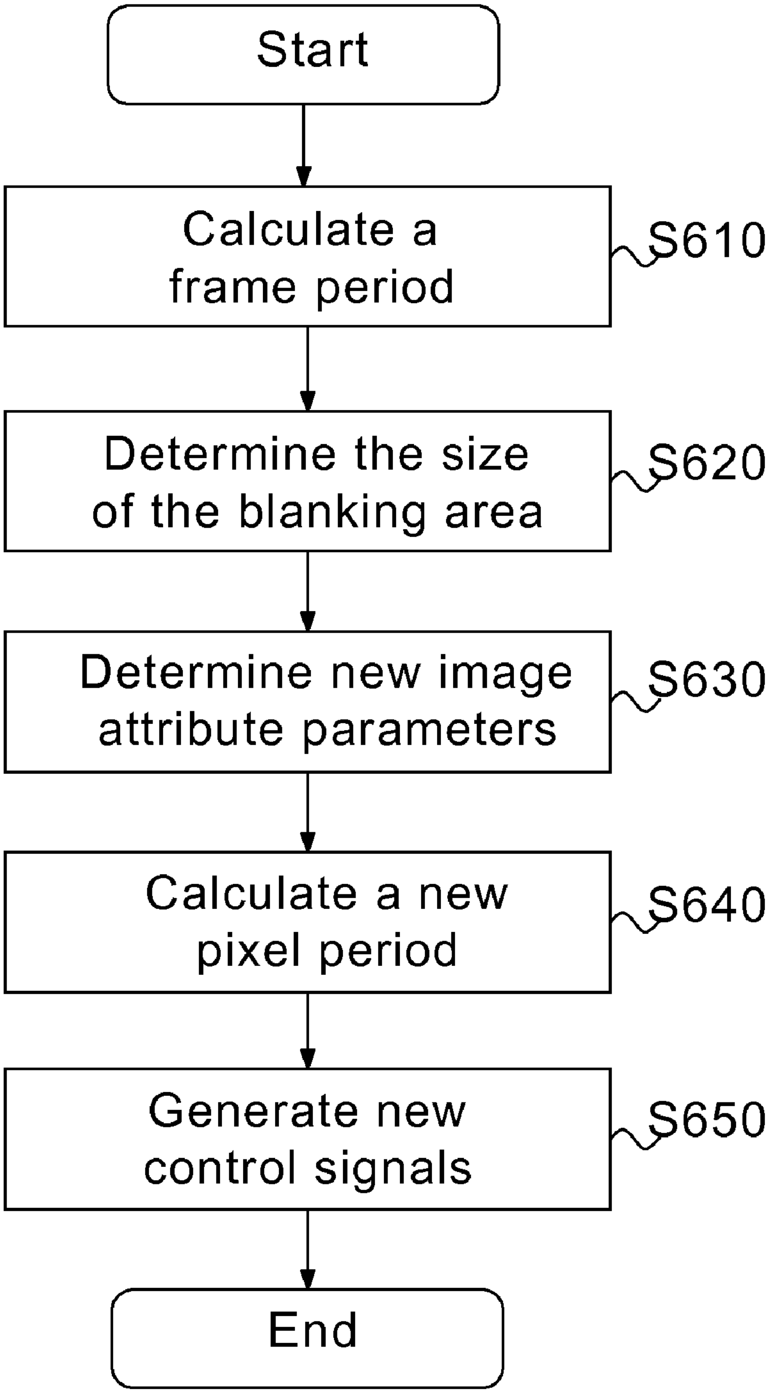
FIG. 6 is a data flow showing a method for reducing output rate of video data according to the invention.

FIG. 6 is a data flow showing a method for reducing output rate of video data according to the invention. The method for reducing output rate of video data of the invention will be hereinafter detailed with reference to FIGS. 5 and 6.

Step S610: a frame period $T_{frame}$ is calculated. The decision unit 560 first accesses the DPCD circuit 570 to obtain a current link rate $F_{link}$ (1.62 Gbps or 2.7 Gbps) and then reduces the current link rate $F_{link}$ to 10% so as to obtain the link symbol rate $F_{sym}$ (162 Mbps or 270 Mbps). Next, according to the frame width $H_{total}$, the frame height $V_{total}$, and the ratio of time stamps values $M_{vid}/N_{vid}$ provided by the decoder 520, an original pixel rate $F_{pix}$ is first obtained by performing the calculation of $F_{pix}=F_{sym}\times(M_{vid}/N_{vid})$ and then an original frame period $T_{frame}$ is obtained by performing the calculation of $T_{frame}=T_{pix}\times H_{total}\times V_{total}=(1/F_{pix})\times H_{total}\times V_{total}$.

Step S620: according to the image attribute parameters $H_{total}$, $V_{total}$, $H_{start}$, $V_{start}$, $H_{width}$, and $V_{height}$, the size of the blanking area (or non-active area) in an original frame is determined.

Step S630: according to the processing rate of the back-end circuit, the storage capacity of the video FIFO 530, and the size of the blanking area, new image attribute parameters $H'_{total}$, $V'_{total}$, $H'_{start}$, and $V'_{start}$ are determined.

Step S640: according to the new image attribute parameters, a new pixel period $T'_{pix}$ is obtained by performing the calculation of $T'_{pix}=T_{frame}\div(H'_{total}\times V'_{total})$. In order for the clock generator 550 to generate a clock $CLK'_{pix}$ having a period $T'_{pix}$, the decision unit 560 has to generate corresponding setting values in advance to set the clock generator 550. For example, by means of setting a current value of a charge pump or adjusting dividers (not shown), the decision unit 560 causes the clock generator 550 to generate the clock $CLK'_{pix}$ according to either the link symbol rate $CLK'_{sym}$ or an independent clock source. In addition, the decision unit 560 can also set a value of a frequency ratio X/Y ($=F_{out}/F_{in}$, where $F_{out}$ and $F_{in}$ respectively denote an output clock frequency and an input clock frequency of the clock generator 550) of the clock generator 550, which causes the clock generator 550 to generate the clock $CLK'_{pix}$. In an alternative embodiment, the clock $CLK'_{pix}$ having the period $T'_{pix}$ can be generated by using direct digital synthesis, or by referring to the link symbol rate $CLK'_{sym}$ or the independent clock source.

Step S650: according to the clock $CLK'_{pix}$ and the image attribute parameters $W_{VS}$, $W_{HS}$, $H'_{total}$, $V'_{total}$, $H'_{start}$, and $V'_{start}$, the control signal generator 540 generates the control signals HS', VS', DE' (similar to those in FIG. 3B, but having longer pixel periods and smaller blanking sizes as shown in FIG. 4), and FIELD'. It should be noted that before generating the control signal DE', the control signal generator 540 will issue a request signal Req to notify the video FIFO 530 to get video data ready. After a pre-defined time has elapsed, the control signal generator 540 and the video FIFO 530 synchronously transmit the control signal DE' and the video data $D_{vid}$ to the back-end circuit.

To summarize, on condition that both the data volume and the contents of an active area are not affected, the frame period $T_{frame}$ has to be fixed first in order to achieve the goal of reducing the pixel rate. Then, a degree of decrease of the pixel rate is determined according to the processing rate limit of the back-end circuit. Next, the size of the blanking area in the original frame format is examined. The degree of decrease of the pixel rate is limited if the size of the blanking area is small or the storage capacity of the video FIFO 530 is not large enough. On the contrary, if the size of the blanking area and the storage capacity of the video buffer 530 are large enough, the goal of reducing the pixel rate can be easily achieved.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A method for reducing output rate of video data for a sink device having a digital display interface, comprising the steps of:

storing input video data in a buffer according to a link symbol clock;

calculating a period of a first frame according to a width of the first frame and a height of the first frame, a ratio of time stamp values and a link symbol clock having the link symbol rate;

determining a second pixel rate of the sink device according to a format of the first frame and the period of the first frame; and generating at least a control signal to access the input video data that stores is stored in the buffer according to a second pixel clock having the second pixel rate.

2. The method according to claim 1, wherein the determining step further comprising:

determining the second pixel rate of the sink device according to a hardware capability of the sink device.

3. The method according to claim 2, wherein the determining step comprises:

determining a left blanking width of a second frame, a top blanking height of the second frame, a width of the second frame and a height of the second frame according to a size of a blanking area in the first frame, the hardware capability of the sink device and the period of the first frame; and calculating the second pixel rate according to both the width of the second frame and the height of the second frame and the period of the first frame.

4. The method according to claim 3, wherein the second pixel rate is equal to the period of the first frame divided by the product of the width of the second frame and the height of the second frame, wherein the size of the blanking area in the first frame depends on the width of the first frame, the height of the first frame, a left blanking width of the first frame and a top blanking height of the first frame, and wherein the hardware capability of the sink device is either an upper-limit processing rate of a back-end circuit of the buffer or a storage capability of the buffer.

5. The method according to claim 1, wherein the ratio of the time stamp values is equal to a ratio of a first pixel rate in a source device to the link symbol rate.

6. The method according to claim 1, wherein the at least one control signal is selected from the group comprising a vertical synchronization signal, a horizontal synchronization signal, a data enable signal, a data request signal and a field signal.

7. The method according to claim 1, wherein the link symbol rate is equal to either 162 Mbps or 270 Mbps.

8. The method according to claim 1, wherein the period of the first frame is equal to a product of the width of the first frame and the height of the first frame divided by a product of the link symbol rate and the ratio of the time stamp values.

9. The method according to claim 1, wherein the digital display interface is a DisplayPort interface.

10. A method for reducing output rate of video data for a sink device having a digital display interface, comprising the steps of:

storing input video data in a buffer according to a link symbol clock;

calculating a period of a first frame according to image attribute parameters of the first frame, a ratio of time stamp values and the link symbol clock having a link symbol rate;

determining a size of a blanking area in the first frame;

determining image attribute parameters of a second frame;

determining a second pixel rate in the sink device; and generating at least a control signal to access the input video data that stores is stored in the buffer according to a second pixel clock having the second pixel rate.

11. The method according to claim 10, wherein the step of determining the image attribute parameters of the second frame comprises:

determining the image attribute parameters of the second frame according to a hardware capability of the sink device and the size of the blanking area in the first frame.

12. The method according to claim 11, wherein the hardware capability of the sink device is either an upper-limit processing rate of a back-end circuit of the buffer or a storage capacity of the buffer.

13. The method according to claim 10, wherein the image attribute parameters comprises a frame width, a frame height, a width of an active area, a height of the active area, a left blanking width and a top blanking width.

14. The method according to claim 10, wherein the ratio of time stamp values is equal to a ratio of a first pixel rate in a source device to the link symbol rate.

15. The method according to claim 10, wherein the digital display interface is a DisplayPort interface.

16. The method according to claim 15, wherein the link symbol rate is equal to either 162 Mbps or 270 Mbps.

17. A method of generating video control signals for a video receiver, comprising the steps of:

receiving a video stream from a video transmitter;

collecting a set of original image attribute parameters from the video stream;

generating a set of adjusted image attribute parameters according to the set of original image attribute parameters, wherein values of at least a portion of parameters among the set of original image attribute parameters are different from those among the set of adjusted image attribute parameters;

generating an adjusted pixel clock, wherein a frequency of the adjusted pixel clock is different from a frequency of an original pixel clock that the video transmitter uses; and generating a set of adjusted video control signals according to the set of adjusted image attribute parameters and the adjusted pixel clock.

18. The method according to claim 17, wherein a frequency of the adjusted pixel clock is lower than that of the original pixel clock.

19. The method according to claim 17, wherein the video receiver is a DisplayPort receiver.

20. The method according to claim 17, wherein the set of original image attribute parameters comprises $H_{total}$, $V_{total}$, $H_{start}$, $V_{start}$, $H_{width}$ and $V_{height}$, and wherein $H_{total}$ denotes a frame width, $V_{total}$ denotes a frame height, $H_{start}$ denotes a left blanking width, $V_{start}$ denotes a top blanking height, $H_{width}$ denotes an active area width, and $V_{height}$ denotes an active area height.

21. The method according to claim 17, wherein the set of the adjusted video control signals comprises HS', VS', DE' and FIELD', and wherein HS' denotes an adjusted horizontal synchronizing signal, VS' denotes an adjusted vertical synchronizing signal, DE' denotes an adjusted data enable signal, FIELD' denotes an adjusted field signal.

22. A video receiver, comprising:

a clock data recovery circuit for receiving a video data and generating a video data and a clock signal;

a decoder coupled to the clock data recovery circuit for decoding the video data and generating a decoded video data and a set of original image attribute parameters;

a video buffer coupled to the decoder for temporarily storing the decoded video data;

a processing circuit coupled to the decoder for generating a set of adjusted image attribute parameters and a set of setting values according to the set of the original image attribute parameters;

a clock generator coupled to the processing circuit for generating an adjusted pixel clock; and a control signal generator for generating a set of adjusted video control signals according to the set of the adjusted image attribute parameters and the adjusted pixel clock;

wherein the video data is provided by a video transmitter and wherein a frequency of the adjusted pixel clock is lower than that of the original pixel clock that the video transmitter uses.

23. The video receiver according to claim 22, which is a DisplayPort receiver.

24. The video receiver according to claim 22, wherein the video buffer outputs the decoded video data according to at least one control signal among the set of adjusted video control signals.

* * * * *